United States Patent
Kowaguchi et al.

[11] Patent Number: 6,118,996
[45] Date of Patent: Sep. 12, 2000

[54] MOBILE COMMUNICATIONS SYSTEM

[75] Inventors: Satoshi Kowaguchi; Hisashi Keirinbou; Takashi Oda; Shinya Usami, all of Tokyo, Japan

[73] Assignee: NEC Corporation, Japan

[21] Appl. No.: 08/988,110

[22] Filed: Dec. 10, 1997

[30] Foreign Application Priority Data

| Dec. 11, 1996 | [JP] | Japan | 8-351959 |
| Dec. 11, 1996 | [JP] | Japan | 8-351960 |
| Dec. 11, 1996 | [JP] | Japan | 8-351961 |

[51] Int. Cl.[7] .................................................. H04J 3/00
[52] U.S. Cl. ........................................................ 455/422
[58] Field of Search ................................ 455/426, 448, 455/468, 435, 556, 412, 422, 574; 379/357; 340/311.1

[56] References Cited

U.S. PATENT DOCUMENTS

| 5,090,051 | 2/1992 | Muppidi et al. | 379/61 |
| 5,463,672 | 10/1995 | Kage | 379/59 |

FOREIGN PATENT DOCUMENTS

| 514360 | 11/1992 | European Pat. Off. | H04Q 7/04 |
| 784411 | 7/1997 | European Pat. Off. | H04Q 7/32 |
| 62-269524 | 11/1987 | Japan | H04B 7/26 |
| 63-174433 | 7/1988 | Japan | H04B 7/26 |
| 3-38122 | 2/1991 | Japan | H04B 7/26 |
| 7-303077 | 11/1995 | Japan | H04B 7/26 |
| 26055 | 11/1994 | WIPO | H04M 11/00 |
| 24893 | 7/1997 | WIPO | H04Q 7/32 |
| WO 98/02006 | 1/1998 | WIPO . | |

*Primary Examiner*—Wellington Chin
*Assistant Examiner*—Pablo N. Tran
*Attorney, Agent, or Firm*—Ostrolenk, Faber, Gerb & Soffen, LLP

[57] ABSTRACT

A mobile communication system includes a one-way communication system where a wide area base station forms a wide one-way communication area and a two-way communication system having a cellular service area which is formed by a plurality of cell base stations each forming a cellular two-way communication area. A mobile terminal can communicate with the one-way communication system and the two-way communication system. Further, a system controller connected to the one-way communication system and the two-way communication system controls mobile communications in the wide one-way communication area and/or the cellular service area. The system controller transfers data addressed to a mobile terminal to the mobile terminal through a selected one of the one-way communication system and the two-way communication system.

31 Claims, 9 Drawing Sheets

MOBILE COMMUNICATIONS SYSTEM

BACKGROUND OF THE INVENTION

1. Field of the Invention

The present invention relates to a mobile communications system which enables two-way communications with a base station.

2. Description of the Prior Art

There have been proposed several mobile communications systems which can perform two-way communication between a mobile terminal and a base station.

In a paging system disclosed in Japanese Patent Application Laid-Open No. 62-269524, when receiving a paging signal from a radio base station, a mobile terminal transmits a reply signal thereto back to the base station and the replay signal is transferred to a control station of the system.

In another paging system disclosed in Japanese Patent Application Laid-Open No. 3-38122, when receiving a paging signal from a base station, the called pager transmits a predetermined recognition signal back to the base station. and the base station, when receiving the recognition signal, sends an acknowledgement to the caller.

A selective call receiver disclosed in Japanese Patent Application Laid-Open No. 63-174433 is provided with a function such that, when receiving a message including a replay request from a source terminal, the called terminal calls back to the source terminal.

However, in the above paging systems, since the mobile terminal receives a paging signal from the wide area selective calling system and then transmits a reply signal to the base station, such a mobile terminal is usable only within the service area of the wide area selective calling system, so that the conventional two-way communications system cannot achieve sufficient system performance and reliability.

Further, mobile terminals carried by users are battery-powered. Therefore, it is desirable that their power consumption be minimized. There has been proposed a radio telephone terminal that is intended for such reduction in power consumption in Japanese Patent Application Laid-Open No. 7-303077. This radio telephone terminal is equipped with a detector for detecting the remaining amount of battery power. If the battery remaining power is greater than or equal to a predetermined amount, location registration is performed every time the telephone terminal moves to an adjacent communicable area (cell). If the battery remaining power is smaller than the predetermined amount, the user is merely informed of non-effectiveness of location registration. Further, the time interval of reception of control signals from a base station and that of location registration are varied in accordance with the battery remaining power, to reduce the battery consumption and in turn elongate the usable time.

However, a transmission operation for location registration requires a large amount of power because of driving of a high-frequency amplifier. In the conventional radio communication terminal as described above, because it is necessary to perform, on a regular basis, transmission and reception operations for location registration with the base station, the battery is consumed at a high rate and the usable time cannot be made sufficiently long.

SUMMARY OF THE INVENTION

An object of the present invention is to provide a mobile communication system and a mobile terminal which can perform two-way communication with reduced power consumption.

Another object of the invention is to provide a communication system and data transmission method which can achieve sufficient system performance and reliability in two-way communication.

According to the present invention, a mobile communication system includes a one-way communication system where a wide area base station forms a wide one-way communication area, a two-way communication system having a cellular service area which is formed by a plurality of cell base stations each forming a cellular two-way communication area, a plurality of mobile terminals each for communicating with the one-way communication system and the two-way communication system, and a system controller connected to the one-way communication system and the two-way communication system, for controlling mobile communications in the wide one-way communication area and/or the cellular service area. The system controller transfers data addressed to a mobile terminal to the mobile terminal through a selected one of the one-way communication system and the two-way communication system.

Each of the mobile terminals may include a detector for detecting a wide area radio condition of the wide one-way communication area and a cellular radio condition of the cellular two-way communication area, respectively. The mobile terminal transmits terminal information including the wide area radio condition and the cellular radio condition to the system controller, wherein the system controller selects one of the one-way communication system and the two-way communication system depending to which one of the wide area radio condition and the cellular radio condition is better.

The system controller may transmit a start-up signal to the mobile terminal through the one-way communication system, the start-up signal causing the mobile terminal to activate a two-way communication transceiver provided therein so as to receive the data addressed thereto. When receiving the start-up signal from the system controller, the mobile terminal transmits a data check signal to the system controller through the two-way communication system at predetermined time intervals. The data check signal causes the system controller to search for the data addressed to the mobile terminal. And then, the mobile terminal receives the data from the system controller when the data is found.

DESCRIPTION OF THE PREFERRED EMBODIMENTS COMMUNICATION SYSTEM

Figure 1:
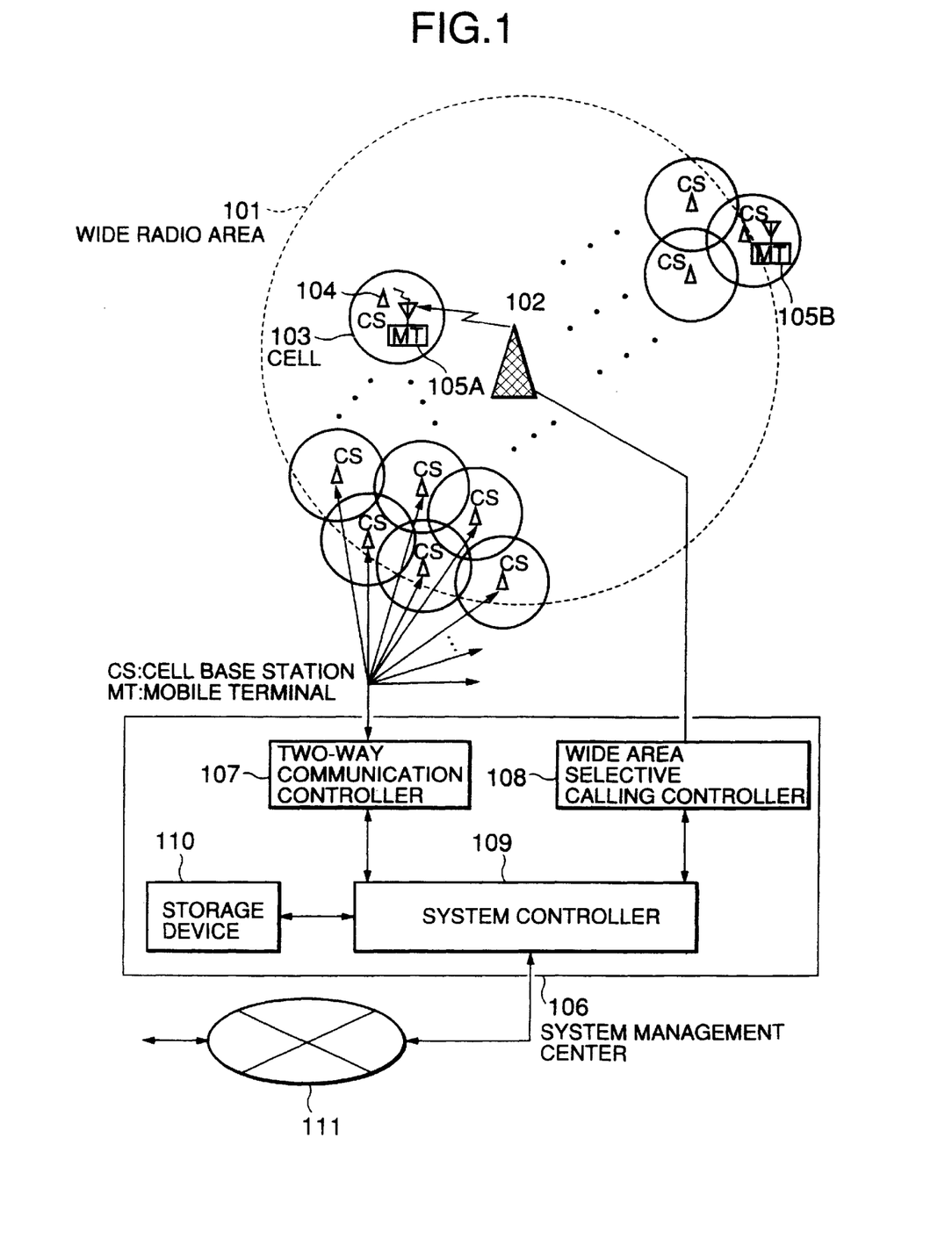
FIG. 1 is a schematic block diagram showing an example of a system configuration of a communication system according to the present invention.

Referring to FIG. 1, a communication system is composed of a wide area base station 102 for forming a wide radio area 101, a plurality of cell base stations (CS) 104 for forming narrow radio areas (cells) 103 that are arranged in cellular form, and a plurality of mobile terminals (MT) carried by users. There are two kinds of communicable areas: a first radio area that belongs to both of the wide radio area 101 and the service area of the plurality of cells 103, and a second radio area that belongs to only one of those. For example, location 105A as shown in FIG. 1 belongs to both areas and location 105B exists outside the wide radio area 101 but inside the cell of the nearest cell base station 104.

The above communication system is controlled by a system management center 106. That is, the system management center 106 unifies and controls the wide area base station 102 and the plurality of cell base stations 103. The system management center 106 is comprised of a two-way communication controller 107 that is connected to the plurality of cell base stations 103, a wide area selective calling controller 108 that is connected to the wide area base station 102, a system controller 109 for controlling the two-way communication controller 107 and the wide area selective calling controller 108, and a storage device 110 for storing data received from the respective terminals. Further, the system management center 106 can be connected, via a public network 111, to the terminal of a party to communicate with.

Mobile Terminal

Figure 2:
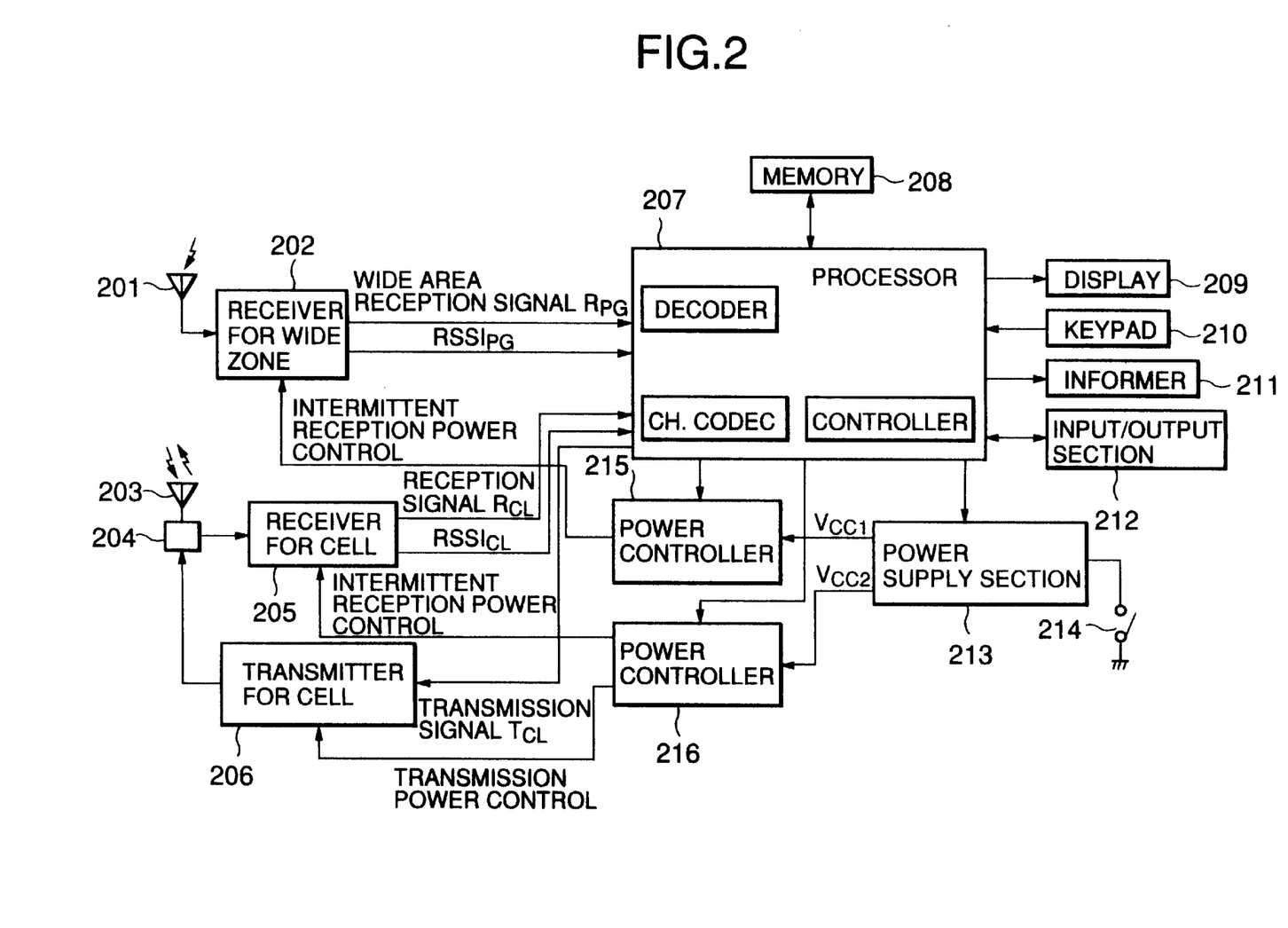
FIG. 2 is a block diagram showing a mobile terminal for use in an embodiment of a mobile communication system according to the present invention.

Referring to FIG. 2, an antenna 201 for receiving a radio signal from the wide area base station 102 is connected to a wide area receiver 202. An antenna 203 for communication with cell base stations 104 is connected to a receiver 205 and a transmitter 206 via an antenna switch 204. The wide area receiver 202 demodulates a radio signal that is transmitted from the wide area base station 102 and outputs a reception signal $R_{PG}$ and a received electric field strength $RSSI_{PG}$ to a processor 207. The receiver 205 demodulates a radio signal that is received from the cell base stations 104 and outputs a reception signal $R_{CL}$ and a received electric field strength $RSSI_{CL}$ to the processor 207. The transmitter 206 modulates and power-amplifies a transmission signal $T_{CL}$ received from the processor 207 and outputs a resulting radio-frequency signal to the antenna, 203 via the antenna switch 204.

The processor 207 serves as a decoder for decoding the wide area reception signal $R_{PG}$ and executing a synchronization process, a detector for calculating the error rate of decoded reception data, and a channel encoder/decoder (codec) for performing channel controls on the reception signal $R_{CL}$ and the transmission signal $T_{CL}$, as well as realizes other functions and communication controls as will be described later. These functions and terminal controls as will be described later are performed by the processor 207 executing programs stored in a read-only memory (not shown). A memory 208 connected to the processor 207 stores a received message addressed thereto that is transmitted from the wide area base station 102, messages or data that is input by the user, fixed-form data to be used for making an acknowledgement of a received message, and other messages and data.

Further, a display 209 such as a liquid crystal display (LCD), a keypad 210, an informer 211 such as a speaker or beeper, and an external data input/output section 212 are connected to the processor 207. A reception message and other necessary messages are displayed on the display 209 in accordance with a user's instruction input through the keypad 210. The informer 211 makes a sound, light or vibration to the effect that a call has occurred. To perform two-way communication via a cell base station 104, reception data and transmission data are exchanged via the input/output section 212. For example, in the case of a wireless telephone, a speech reception and transmission are effected by a speaker and a microphone through the input/output section 212, respectively.

A power supply section 213 includes a battery and is turned on/off by a control of the processor 207 or by means of a power switch 214. The power supply section 213 generates different power supply voltages $V_{CC1}$ and $V_{CC2}$ (here, $V_{CC1} < V_{CC2}$). While the power supply voltage $V_{CC1}$ is supplied to the wide area receiver 202 via a power controller 215, the power supply voltage $V_{CC2}$ is supplied to the receiver 205 and the transmitter 206 for two-way communication via a power controller 216. The power controller 215 always on/off-controls the intermittent receiving operation of the wide area receiver 202 under the control of the processor 207. Further, the power controller 216 on/off-controls the intermittent receiving operation of the receiver 205 and controls the transmission power of the transmitter 206 under the control of the processor 207.

The wide area receiver 202 can operate on lower power than the receiver 205 and the transmitter 206 for two-way communication, because neither the location registration nor the channel switching is necessary unlike the case of two-way communication and the intermittent receiving operation is performed at a relatively low voltage. Therefore, the wide area receiver 202 can operate for a long time.

Communication Control

Communication operations and data transmission of the above mobile communication system will be hereinafter.

Figure 3:
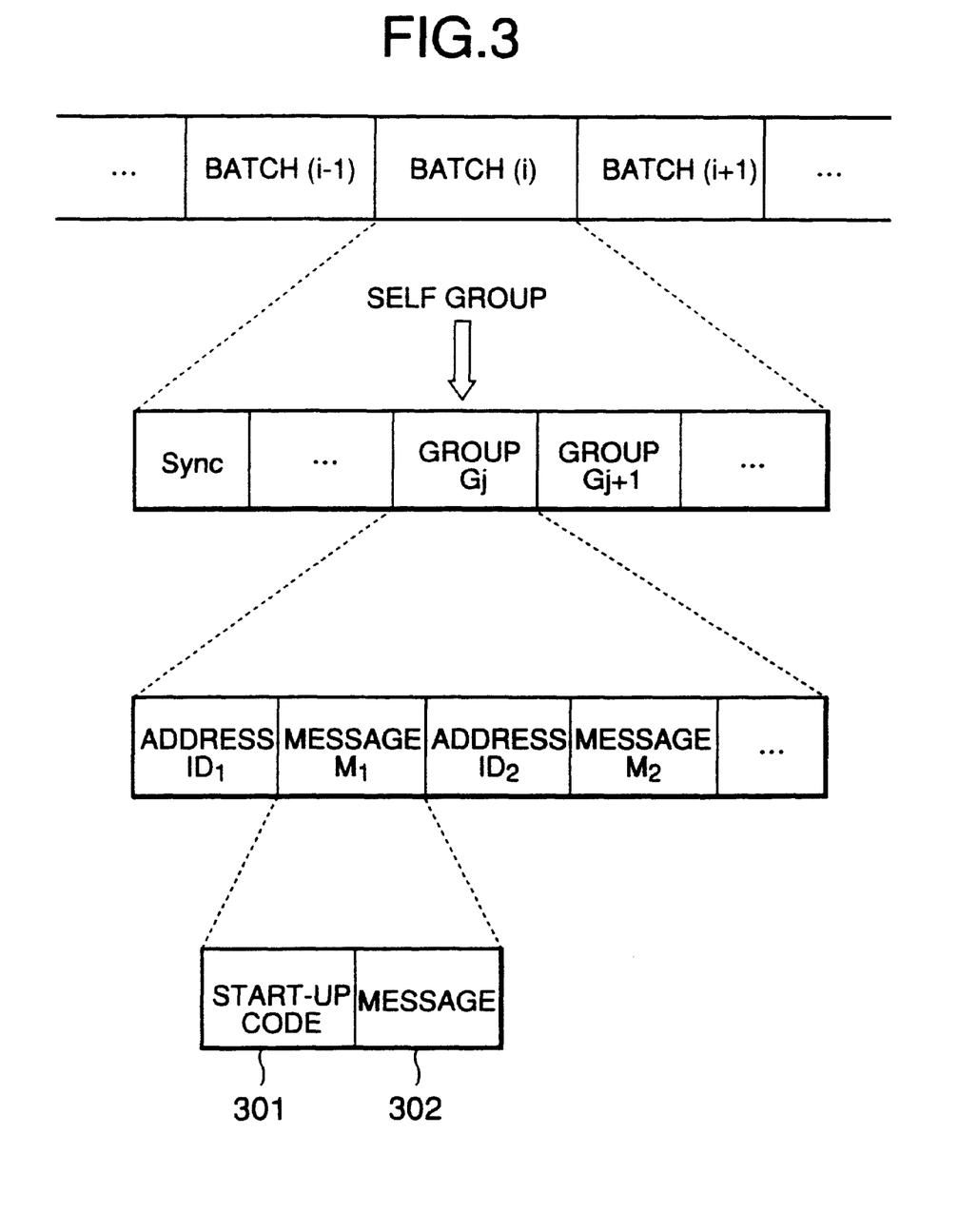
FIG. 3 is a diagram showing a format of a wide area selective calling signal in the communication system.

As shown in FIG. 3, assuming a wide area selective calling signal, which is transmitted by the wide area base station 102. The wide area selective calling signal includes a plurality of batches each including a sync signal followed by a plurality of groups. Each group is composed of a plurality of pairs of address section (ID) and message section (M). Each message section (M) includes desired message data, for example, a start-up signal 301 and a message 302. The start-up signal 301, as will be described later, is used to start the cell receiver 205 and the cell transmitter 206 operating for location registration and then two-way communication.

FIRST EMBODIMENT

Figure 4:
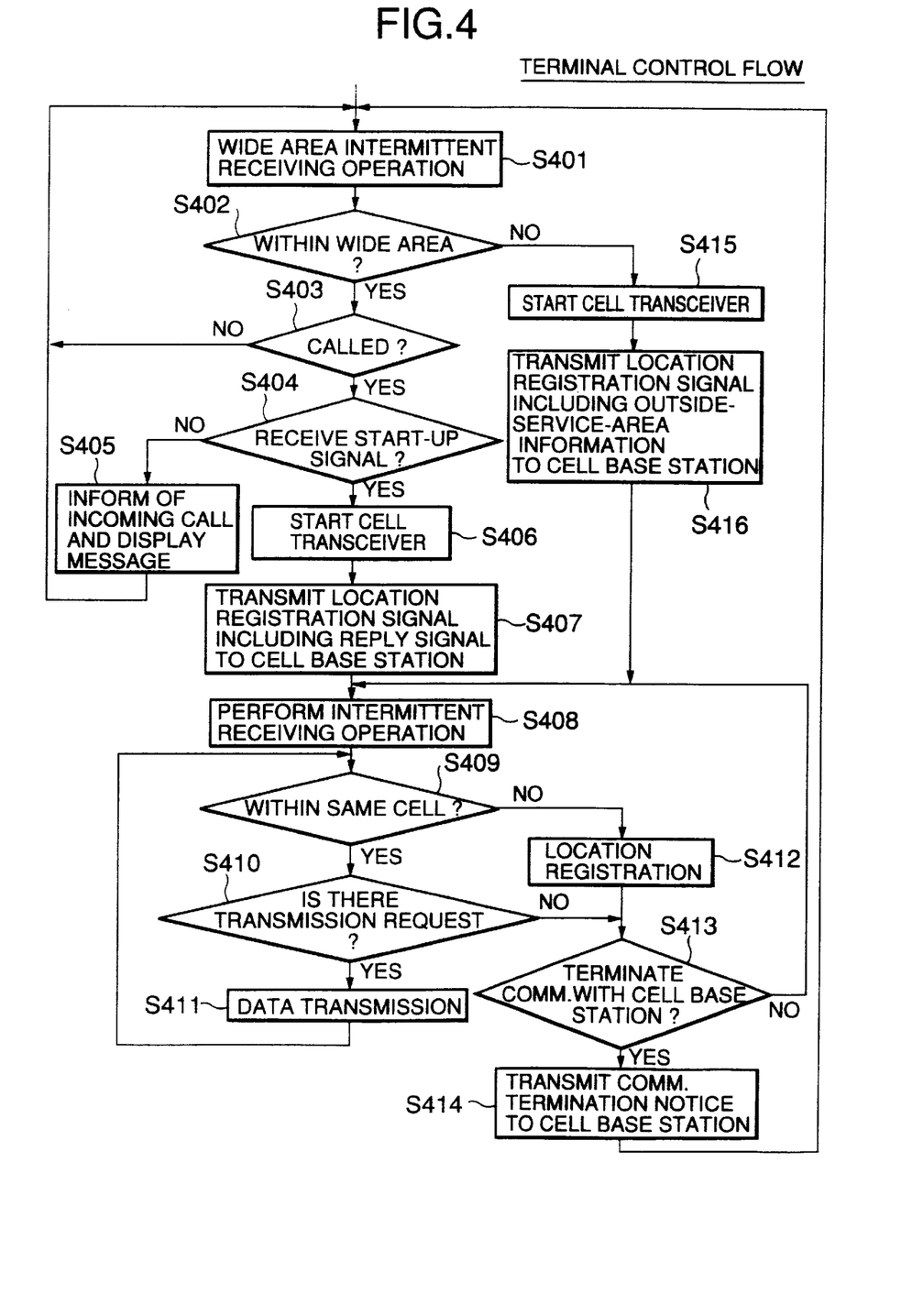
FIG. 4 is a flowchart showing a communication operation of the mobile communication terminal according to a first embodiment of the present invention.

The mobile terminal MT usually performs the wide area intermittent receiving operation. When receiving a message including a start-up signal 301 from the wide area base station 102, the mobile terminal MT starts the two-way communication and data addressed to the mobile terminal MT is transferred from the system management center 106 to the mobile terminal MT through the nearest cell base station CS. Further, when the mobile terminal MT moves outside the wide radio service area 101, the mobile terminal MT also starts the two-way communication. The details will be described hereinafter.

Referring to FIG. 4, when the switch 214 is closed, the power supply voltage $V_{CC1}$ is supplied from the power supply section 213 to the power controller 215 which supplies power to the wide area receiver 202, whereby a wide area intermittent receiving operation is started (S401). More specifically, the processor 207 executes a synchronization process in accordance with a reception signal that is received from the wide area base station 102. When detecting a signal including a message addressed to the terminal itself, that is, when detecting the receiving timing of its own group (see FIG. 3), the processor 207 outputs an intermittent control signal to the power controller 215 to render the wide area receiver 202 in an intermittent receiving state. The wide area receiver 202 is always in the intermittent receiving state and hence can always receive a signal from the wide area base station 102.

The processor 207 checks whether the terminal is within the wide service area 101 by monitoring the error rate of a reception signal of its own group (S402). The received electric field strength $RSSI_{PG}$ may be used to check whether the terminal is within the wide service area 101. If it is judged that the terminal is within the wide service area 101 (yes at step S402), the processor 207 checks whether the self address is included in that group (S403). If the self address is detected (yes at step S403), the processor 207 stores received data of a message section (for instance, a message section $M_1$ shown in FIG. 3) onto the memory 208 and further checks whether the message section of the self address includes the start-up signal 301 (S404). If no start-up signal is included (no at step S404), the processor 207 drives the informer 211 to informs the user of the occurrence of an incoming call and, if the user thinks it necessary, he/she operates the keypad 210 so that the reception message 302 are displayed on the display 209 (S405). The wide area intermittent receiving operation S401–S405 is thereafter repeated whereby the wide area receiver 202 can receive data that is transmitted from the wide area base station 102 at all times.

On the other hand, if the start-up signal 301 is included (yes at step S404), the processor 207 starts a communication with a cell base station 104 by outputting a control signal to the power controller 216 so that the power controller 216 supplies power supply voltages to the receiver 205 and the transmitter 206 of two-way communication to activate those sections (S406). First, the processor 207 generates a reply signal to the start-up signal and causes the transmitter 206 to transmit location registration signal including the reply signal to the nearest cell base station 104 (S407). The cell base station 104 that has received the location registration signal performs location registration of the mobile communication terminal concerned.

Once the location registration is effected, the mobile terminal MT intermittently receives data from the location-registered cell base station 104 through the receiver 205 (S408). More specifically, if the terminal is within the same cell (yes at step S409), the receiver 205 intermittently receives a signal that is transmitted from the location-registered cell base station 104 in accordance with the intermittent reception power control by the power controller 216 unless there comes a transmission request (no at step S410). In the case of transmitting data (yes at step S410), the user operates the keypad 210, whereupon a fixed-form sentence or other data stored in the memory 208 is read out and sent to the transmitter 206 as a transmission signal TCL, and finally transmitted to the location-registered cell base station 104 (S411). If the mobile terminal MT moves to an adjacent cell (no at step S409), an operation for location registration is performed with respect to the cell base station 104 of the adjacent cell (S412) in the same manner as described above and the above-described steps (S408–S413) are repeated. In this manner, the mobile terminal can receive data from the cell base station 104 rather than the wide area base station 102 as well as can transmit data when necessary. In the case where the communication with the cell base station 104 is terminated (yes at step S413), the processor 207 generates a communication termination notice and the transmitter 206 transmits it to the cell base station 104 concerned, whereby the communication with the cell base station 104 is finished (S414). The processor 207 then effects a transition to the intermittent receiving mode with the wide area receiver 202 (S401).

On the other hand, if it is judged that the terminal is out of the wide service area 101 (no at step S402), the processor 207 starts a communication with a cell base station 104 by outputting a control signal to the power controller 216 so that the power controller 216 supplies power supply voltages to the receiver 205 and the transmitter 206 of two-way communication to activate those sections (S415). The processor 207 generates outside-service-area information indicating that the mobile terminal itself is outside the wide service area 101 and causes the transmitter 206 to transmit the location registration signal including the outside-service-area information to the nearest cell base station 104 (S416). The cell base station 104 that has received the location registration signal performs location registration of the mobile communication terminal concerned. After the location registration, the mobile terminal MT intermittently receives data from the location-registered cell base station 104 through the receiver 205 (S408). In other words, the mobile terminal MT waits for message addressed thereto.

A channel switching control is also performed in the system management center 106 in link with the above-described communication operation of the mobile terminal MT.

Figure 5:
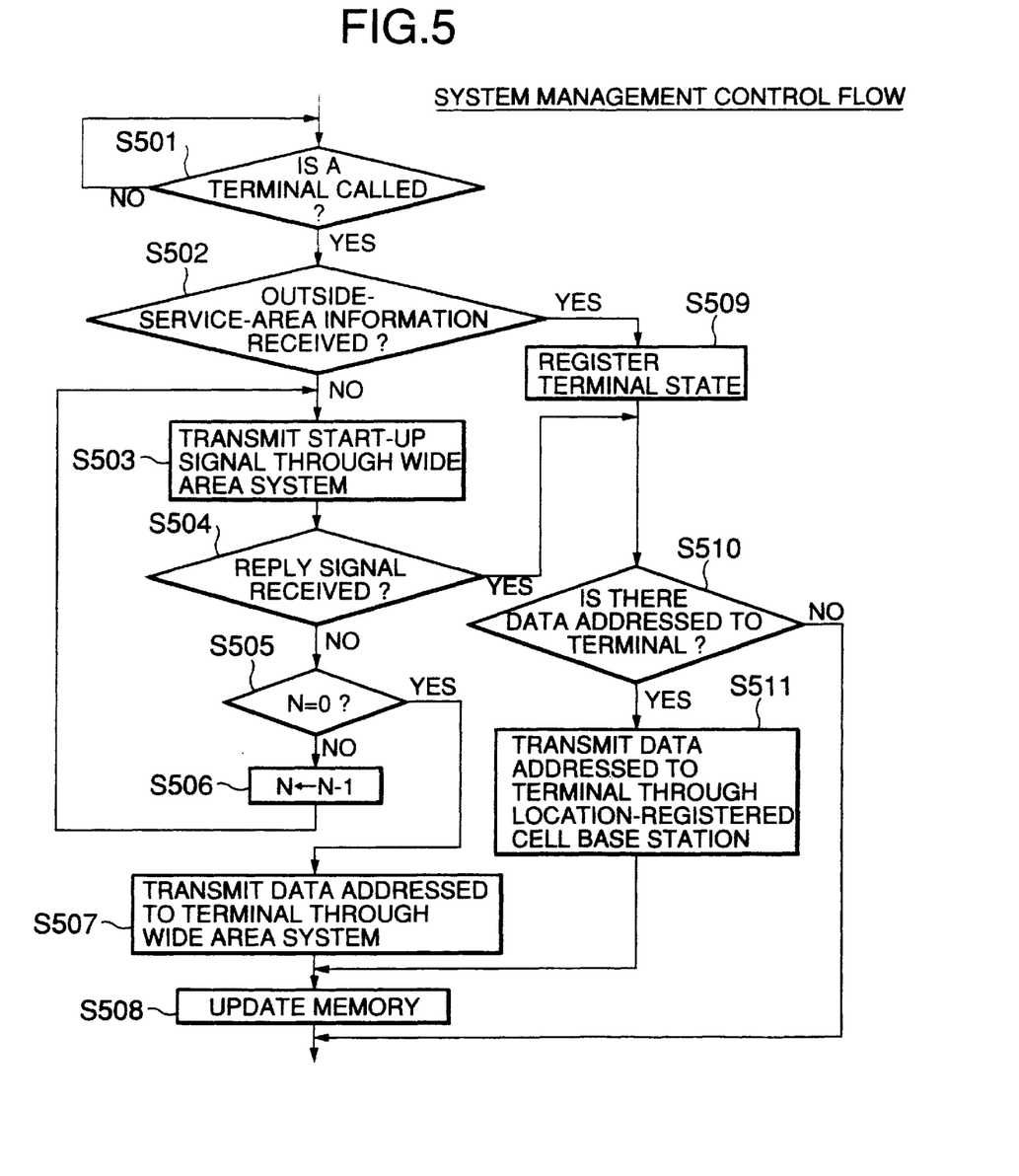
FIG. 5 is a flowchart showing a communication control operation of the system management center according to the first embodiment of the present invention.

FIG. 5 shows a communication control operation of the system management center 106 of the communication system according to the invention. When a mobile terminal is called (yes at step S501), the system controller 109 checks whether outside-service-area information has received from that mobile terminal (S502). When the outside-service-area information has not been received yet (no at step S502), it is determined that the mobile terminal is located within the wide area 101. Therefore, the system controller 109 instructs the wide area selective calling controller 108 to transmit a start-up signal to that mobile terminal through the wide area base station 102 (S503). If a replay signal to the start-up signal is not received from the mobile terminal (no at step S504), the start-up signal is repeatedly transmitted to the mobile terminal N times (S505 and S506), where N is a preset integer.

In the case where no reply signal is received after the start-up signal has been transmitted N times (yes at step S505), it is determined that the mobile terminal is located within the wide area 101 but outside the two-way communication service area. Therefore, the system controller 109 instructs the wide area selective calling controller 108 to transmit data addressed to the mobile terminal (S507). After all data have been transmitted, the system controller 109 updates the memory contents of the storage device 110 (S508).

On the other hand, when the outside-service-area information has received (yes at step S502), it is determined that the mobile terminal is located outside the wide area 101. Therefore, the system controller 109 registers the terminal information of the mobile terminal onto the storage device 110 without transmitting the start-up signal (S509). Subsequently, the system controller 109 searches the storage device 110 for message addressed to the mobile terminal (S510). If a message addressed thereto is stored (yes at step S510), the message is transmitted to the mobile terminal through the location-registered cell base station (S511).

As described above, in cases where the mobile terminal is located within the wide area 101 and the two-way communication service area, the transmitter and the receiver for two-way communication are activated when the start-up signal is received from the wide area base station and then data addressed thereto is received through the nearest cell base station. More specifically, after the location of the mobile terminal is registered in the cell base station, the mobile terminal enters a data waiting state and intermittently receives data addressed thereto through the location-registered cell base station.

In cases where the mobile terminal is located outside the wide area 101 but within the two-way communication service area, the mobile terminal transmits outside-service-area information to the system management center through the two-way communication system. In this case, the system management center performs message data transmission to the mobile terminal through the two-way communication system without transmitting the start-up signal.

In cases where the mobile terminal is located within the wide area 101 but outside the two-way communication service area, that is, when no replay signal is received from the mobile terminal after the start-up signal is transmitted N times, data is transmitted to the mobile terminal through the wide area selective calling system.

Therefore, efficient data transmission is achieved with reliability. Further, the mobile terminal waits for start-up signal while operating the wide area receiver having a lower power consumption and, upon reception of the start-up signal, the receiver and transmitter for two-way communication which needs a larger power consumption are activated. As a result, useless battery consumption can be reduced and hence the usable time can be elongated.

SECOND EMBODIMENT

Figure 6:
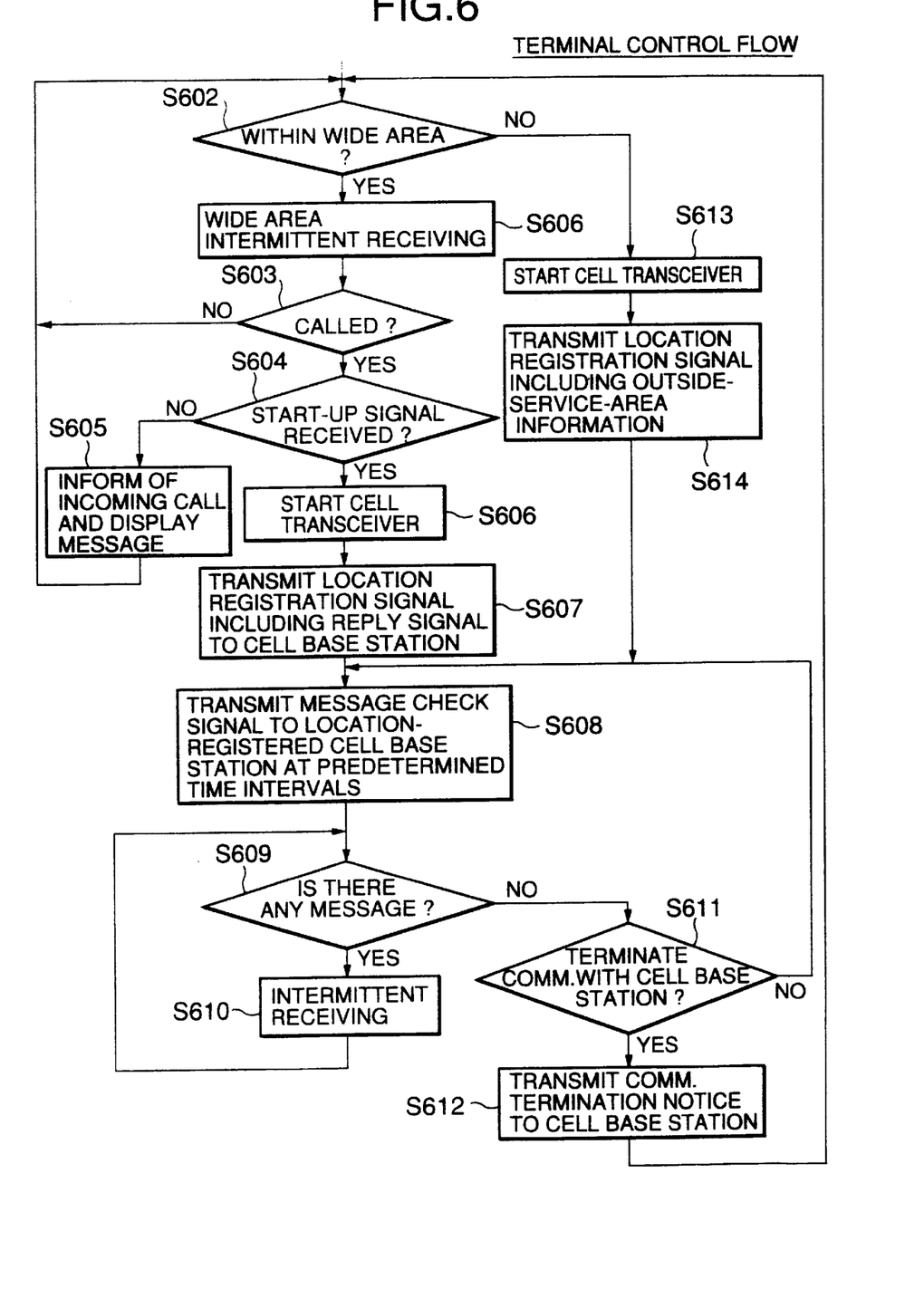
FIG. 6 is a flowchart showing a communication operation of the mobile communication terminal according to a second embodiment of the present invention.

The mobile terminal MT usually performs the wide area intermittent receiving operation. When receiving a message including a start-up signal 301 from the wide area base station 102, the mobile terminal MT starts the two-way communication and transmits a message check signal which is used to check whether a message addressed thereto is stored to the system management center 106. If the message addressed thereto is stored in the system management center 106, the message data is transferred from the system management center 106 to the mobile terminal MT through the nearest cell base station CS. Further, when the mobile terminal MT moves outside the wide radio service area 101, the mobile terminal MT also starts the two-way communication. The details will be described hereinafter.

Referring to FIG. 6, when the switch 214 is closed, the power supply voltage $V_{CC1}$ is supplied from the power supply section 213 to the power controller 215 which supplies power to the wide area receiver 202. The wide area receiver 202 detects the wide area received electric field strength $RSSI_{PG}$ from a radio signal received from the wide area base station 102 and outputs it to the processor 207. The processor 207 determines from the detected electric field strength $RSSI_{PG}$ whether the mobile terminal is located within the wide area 101 (S601). In the case where the mobile terminal is located within the wide area 101 (yes at step S601), the processor 207 starts the wide area intermittent receiving operation (S602).

More specifically, the processor 207 executes a synchronization process in accordance with a reception signal that is received from the wide area base station 102. When detecting a signal including a message addressed to the terminal itself, that is, when detecting the receiving timing of its own group (see FIG. 3), the processor 207 outputs an intermittent control signal to the power controller 215 to render the wide area receiver 202 in an intermittent receiving state. The wide area receiver 202 is always in the intermittent receiving state and hence can always receive a signal from the wide area base station 102. It should be noted that the processor 207 can use the error rate of a reception signal of its own group to check whether the terminal is within the wide service area 101.

Subsequently, the processor 207 checks whether the self address is included in that group (S603). If the self address is detected (yes at step S603), the processor 207 stores received data of a message section (for instance, a message section $M_1$ shown in FIG. 3) onto the memory 208 and further checks whether the message section of the self address includes the start-up signal 301 (S604). If no start-up signal is included (no at step S604), the processor 207 drives the informer 211 to informs the user of the occurrence of an incoming call and, if the user thinks it necessary, he/she operates the keypad 210 so that the reception message 302 are displayed on the display 209 (S605). The wide area intermittent receiving operation S601–S605 is thereafter repeated whereby the wide area receiver 202 can receive data that is transmitted from the wide area base station 102 at all times.

On the other hand, if the start-up signal 301 is included (yes at step S604), the processor 207 starts a communication with a cell base station 104 by outputting a control signal to the power controller 216 so that the power controller 216 supplies power supply voltages to the receiver 205 and the transmitter 206 of two-way communication to activate those sections (S606). First, the processor 207 generates a reply signal to the start-up signal and causes the transmitter 206 to transmit location registration signal including the reply signal to the nearest cell base station 104 (S607). The cell base station 104 that has received the location registration signal performs location registration of the mobile communication terminal concerned.

Subsequently, the processor 207 generates a message check signal for checking whether a message addressed thereto has been received and transmits the message check signal to the location-registered cell base station through the transmitter 206 at predetermined time intervals, for example, thirty-minutes intervals (S608). The message check signal is transferred to the system controller 109 through the cell base station and the two-way communication controller 107. Each time receiving the message check signal from the mobile terminal, the system controller 109 searches the storage device 110 for messages addressed to the mobile terminal and transmits the search result back to the mobile terminal.

When receiving a search result indicating that a message addressed thereto is stored (yes at step S609), the mobile terminal intermittently receives data from the location-registered cell base station 104 through the receiver 205 (S610). More specifically, the receiver 205 intermittently receives a signal that is transmitted from the location-registered cell base station 104 in accordance with the intermittent reception power control by the power controller 216. In the case of transmitting data, the user operates the keypad 210, whereupon a fixed-form sentence or other data stored in the memory 208 is read out and sent to the transmitter 206 as a transmission signal $T_{CL}$, and finally transmitted to the location-registered cell base station 104. If the mobile terminal MT moves to an adjacent cell, an operation for location registration is performed with respect to the cell base station 104 of the adjacent cell in the same manner as described above and the above-described steps (S608–S610) are repeated.

On the other hand, when receiving a search result indicating that no message addressed thereto is stored (no at step S609), it is checked whether the communication with the cell base station 104 is terminated (S611). If the communication with the cell base station 104 is not terminated (no at step S611), the steps S608–S611 are repeatedly performed. If terminated (yes at step S611), the processor 207 generates a communication termination notice and the transmitter 206 transmits it to the cell base station 104 concerned, whereby the communication with the cell base station 104 is finished (S612). The processor 207 then effects a transition to the intermittent receiving mode with the wide area receiver 202 (S601).

On the other hand, if it is judged that the terminal is out of the wide service area 101 (no at step S601), the processor 207 starts a communication with a cell base station 104 by outputting a control signal to the power controller 216 so that the power controller 216 supplies power supply voltages to the receiver 205 and the transmitter 206 of two-way communication to activate those sections (S613). The processor 207 generates outside-service-area information indicating that the mobile terminal itself is outside the wide service area 101 and causes the transmitter 206 to transmit the location registration signal including the outside-service-area information to the nearest cell base station 104 (S614). And then the message check signal is transmitted as described before (S608).

A channel switching control is also performed in the system management center 106 in link with the above-described communication operation of the mobile terminal MT.

Figure 7:
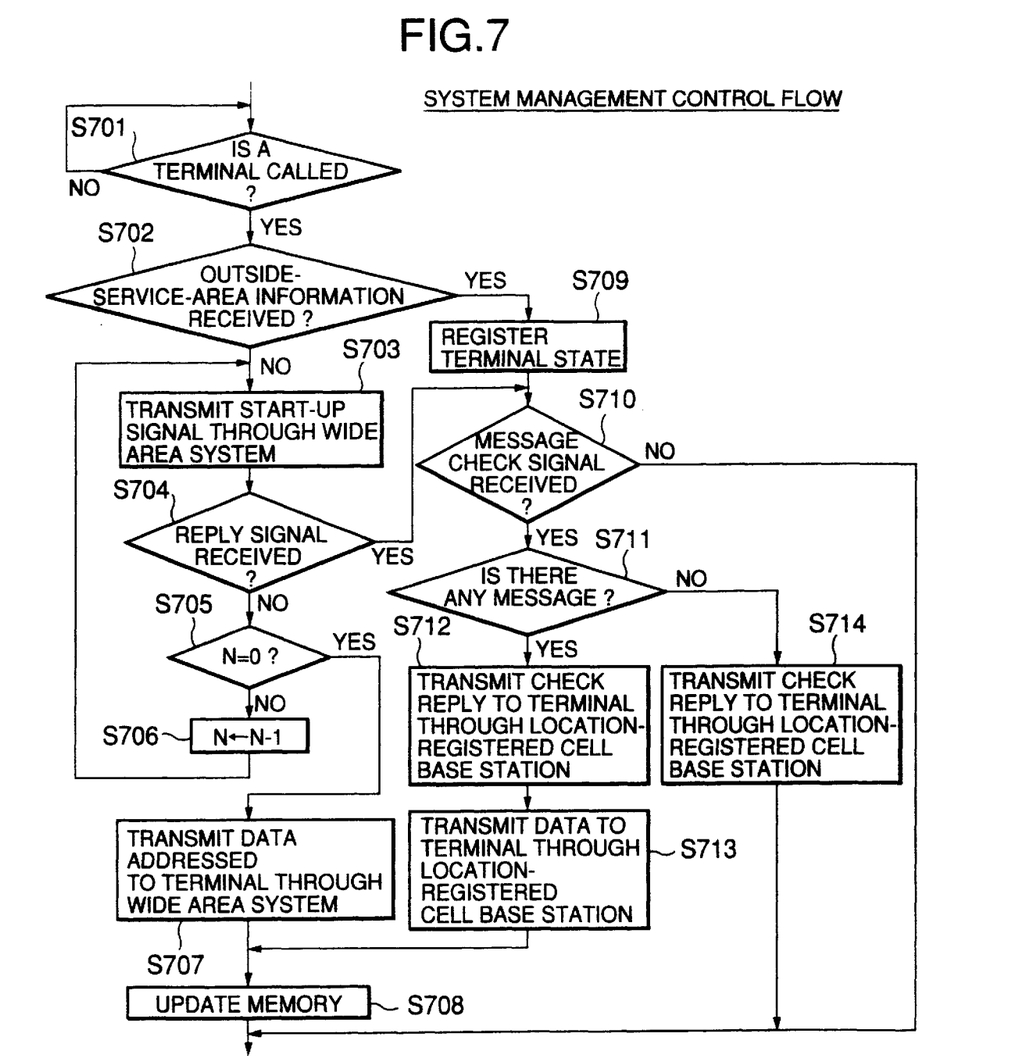
FIG. 7 is a flowchart showing a communication control operation of the system management center according to the second embodiment of the present invention.

FIG. 7 shows a communication control operation of the system management center 106 of the communication system according to the invention. When a mobile terminal is called (yes at step S701), the system controller 109 checks whether outside-service-area information has received from that mobile terminal (S702). When the outside-service-area information has not been received yet (no at step S702), it is determined that the mobile terminal is located within the wide area 101. Therefore, the system controller 109 instructs the wide area selective calling controller 108 to transmit a start-up signal to that mobile terminal through the wide area base station 102 (S703). If a replay signal to the start-up signal is not received from the mobile terminal (no at step S704), the start-up signal is repeatedly transmitted to the mobile terminal N times (S705 and S706), where N is a preset integer.

In the case where no reply signal is received after the start-up signal has been transmitted N times (yes at step S705), it is determined that the mobile terminal is located within the wide area 101 but outside the two-way communication service area. Therefore, the system controller 109 instructs the wide area selective calling controller 108 to transmit data addressed to the mobile terminal (S707). After all data have been transmitted, the system controller 109 updates the memory contents of the storage device 110 (S708).

On the other hand, when the outside-service-area information has received (yes at step S702), it is determined that the mobile terminal is located outside the wide area 101. Therefore, the system controller 109 registers the terminal information of the mobile terminal onto the storage device 110 without transmitting the start-up signal (S709) and then waits for a message check signal to be received from the mobile terminal (S710).

When the message check signal is received from the mobile terminal (yes at step S710), the system controller 109 searches the storage device 110 for a message addressed to the mobile terminal (S711). When such a message is stored in the storage device 110 (yes at step S711), a message check reply signal indicating that the message has been received is transmitted back to the mobile terminal through the location-registered cell base station (S712) and the message data is transmitted to the mobile terminal through the location-registered cell base station (S713). When such a message is not stored in the storage device 110 (no at step S711), a message check reply signal indicating that no message has been received is merely transmitted back to the mobile terminal through the location-registered cell base station (S714).

As described above, in cases where the mobile terminal is located within the wide area 101 and the two-way communication service area, the transmitter and the receiver for two-way communication are activated when the start-up signal is received from the wide area base station and then data addressed thereto is received through the nearest cell base station. More specifically, the mobile terminal inquires whether a message addressed thereto has been received by transmitting the message check signal and, if the message addressed thereto is stored, the message data addressed thereto is transferred to the mobile terminal through the location-registered cell base station.

In cases where the mobile terminal is located outside the wide area 101 but within the two-way communication service area, the mobile terminal transmits outside-service-area information to the system management center through the two-way communication system. In this case, the system management center performs message data transmission to the mobile terminal through the two-way communication system without transmitting the start-up signal.

In cases where the mobile terminal is located within the wide area 101 but outside the two-way communication service area, that is, when no replay signal is received from the mobile terminal after the start-up signal is transmitted N times, data is transmitted to the mobile terminal through the wide area selective calling system.

Therefore, efficient data transmission is achieved with reliability. Further, the mobile terminal waits for start-up signal while operating the wide area receiver having a lower power consumption and, upon reception of the start-up signal, the receiver and transmitter for two-way communication which needs a larger power consumption are activated. As a result, useless battery consumption can be reduced and hence the usable time can be elongated.

THIRD EMBODIMENT

According to the first embodiment, the start-up signal and the replay signal thereto are used to select one of the wide area selective calling system and the cellular two-way communication system. According to the second embodiment, the message check signal is used to perform data transmission from the system management center to the mobile terminal concerned.

In addition, according to the third embodiment, the terminal information including received signal strength is used to select one of the wide area selective calling system and the cellular two-way communication system. More specifically, the wide area receiver 202 and the cell receiver 205 produce the received electric field strength $RSSI_{PG}$ and the received electric field strength $RSSI_{CL}$ to the processor 207, respectively. The processor 207 produces service area information including the received electric field strengths $RSSI_{PG}$ and $RSSI_{CL}$ as terminal information to the cell base station. Using the received electric field strengths $RSSI_{PG}$ and $RSSI_{CL}$ received from the mobile terminal, the system controller 109 determines which one of the two-way communication system and the wide area selective calling system is better for data transmission and transmits data to the mobile terminal through a better system.

Figure 8:
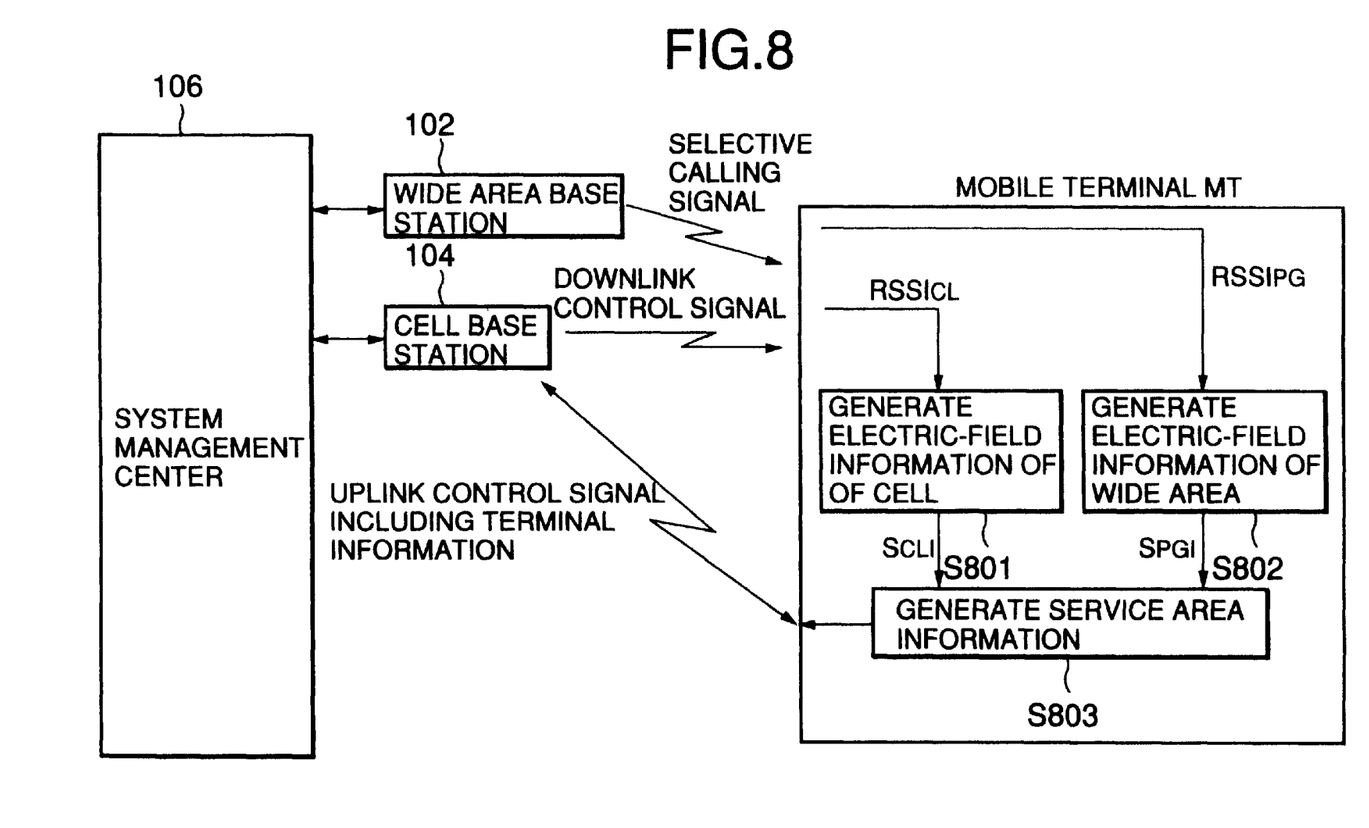
FIG. 8 is a schematic block diagram showing a mobile communication system for explanation of a communication operation according to a third embodiment of the present invention.

Referring to FIG. 8, the wide are receiver 202 of the mobile terminal intermittently receives a selective calling signal from the wide area base station 102 to measure the received electric field strength $RSSI_{PG}$ and the cell receiver 205 receives a downlink control signal from the location-registered cell base station 104 to measure the received electric field strength $RSSI_{CL}$. The processor 207 produces cellular electric field information $S_{CLI}$ from the received electric field strength $RSSI_{CL}$ (S801) and further produces wide area electric field information $S_{PGI}$ from the received electric field strength $RSSI_{PG}$ (S802). The service area information including the cellular electric field information $S_{CLI}$, the wide area electric field information $S_{PGI}$, the identification number of the mobile terminal and other necessary information is generated and transmitted as terminal information to the location-registered cell base station 104 (S803).

Such service area information is transmitted from the mobile terminal to the nearest cell base station at regular time intervals. The service area information is further transferred to the system controller 109 through the two-way communication controller 107 and is stored as the terminal information of the mobile terminal onto the storage device 110.

Figure 9:
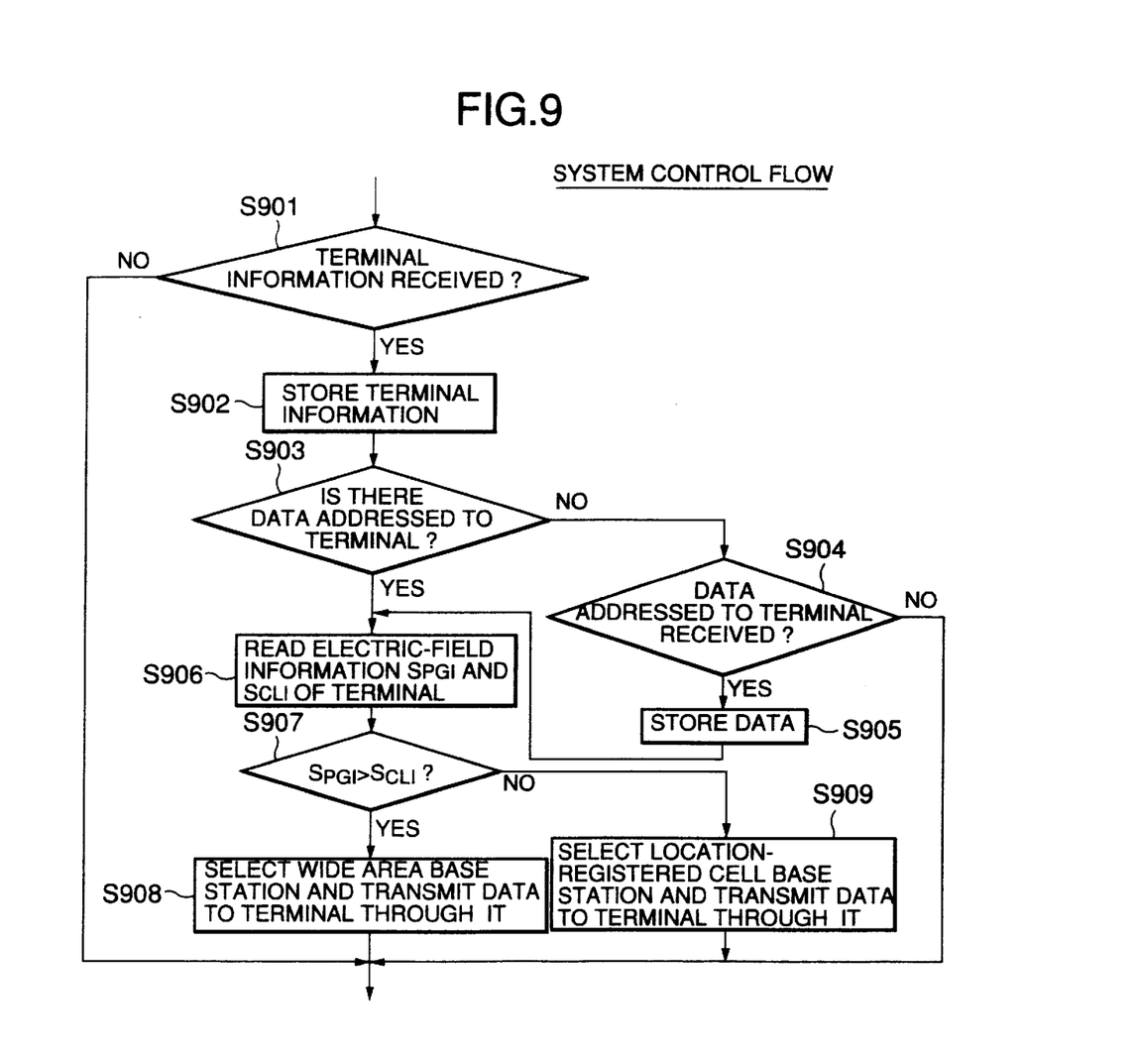
FIG. 9 is a flowchart showing a communication control operation of the system management center according to the third embodiment of the present invention.

FIG. 9 shows a communication control operation of the system management center 106 of the communication system according to the invention. When terminal information as described above is received from a mobile terminal (yes at step S901), the system controller 109 stores the service area information including the cellular electric field information $S_{CLI}$, the wide area electric field information $S_{PGI}$, and the identification number onto the storage device 110 (S902), and then starts searching the storage device 110 for data addressed to the mobile terminal (S903). If no data is stored in the storage device 110 (no at step S903), the system controller 109 further checks whether data address to the mobile terminal is received through the public network 111 (S904). When received (yes at step S904), the received data is stored onto the storage device 110 (S905).

Subsequently, the system controller 109 reads the cellular electric field information $S_{CLI}$ and the wide area electric field information $S_{PGI}$ of the mobile terminal concerned from the storage device 110 (S906) and then compares them (S907). In other words, it is determined which one of the wide area system and the two-way communication system is suitable for data transmission. When $S_{PGI} > S_{CLI}$ (yes at step S907), the radio propagation condition of the wide area 101 is better than that of the cell. Therefore, the system controller 109 selects the wide area selective calling controller and transmits data addressed to the mobile terminal through the wide area base station 102 (S908). On the other hand, $S_{PGI} \leq S_{CLI}$ (no at step S907), the radio propagation condition of the cell is better than that of the wide area 101. Therefore, the system controller 109 selects the two-way communication controller 107 and transmits data addressed to the mobile terminal through the location-registered cell base station (S909).

As described above, based on the received electric field strengths $RSSI_{PG}$ and $RSSI_{CL}$ received from the mobile terminal, it is determined which one of the two-way communication system and the wide area selective calling system is better for data transmission and a better one is selected for data transmission to the mobile terminal. Therefore, efficient data transmission is achieved with reliability.

What is claimed is:

1. A mobile communication system comprising:
   a one-way communication system where a wide area base station forms a wide one-way communication area;
   a two-way communication system having a cellular service area which is formed by a plurality of cell base stations each forming a cellular two-way communication area;
   a plurality of mobile terminals each for communicating with the one-way communication system and the two-way communication system; and
   a system controller connected to the one-way communication system and the two-way communication system, for controlling mobile communications in the wide one-way communication area and/or the cellular service area, wherein the system controller transfers to the mobile telephone data addressed thereto through a selected one of the one-way communication system and the two-way communication system.

2. The mobile communication system according to claim 1, wherein the system controller transmits a start-up signal to the mobile terminal through the one-way communication system, the start-up signal causing the mobile terminal to activate a two-way communication transceiver provided therein so as to receive the data addressed thereto.

3. The mobile communication system according to claim 2, wherein, when receiving the start-up signal from the system controller, the mobile terminal transmits a data check signal to the system controller through the two-way communication system at predetermined time intervals, the data check signal causing the system controller to search for the data addressed to the mobile terminal, and the mobile terminal receives the data from the system controller when the data is found.

4. The mobile communication system according to claim 2, wherein, when receiving the start-up signal from the system controller, the mobile terminal transmits a reply signal to the start-up signal to the system controller before receiving the data from the system controller.

5. The mobile communication system according to claim 4, wherein, when receiving the replay signal from the mobile terminal, the system controller transmits the data addressed to the mobile terminal.

6. The mobile communication system according to claim 4, wherein, when no replay signal is received from the mobile terminal after the start-up signal has been transmitted a predetermined number of times, the system controller transmits the data addressed to the mobile terminal through the one-way communication system.

7. The mobile communication system according to claim 3, wherein, when receiving the start-up signal from the system controller, the mobile terminal transmits a reply signal to the start-up signal to the system controller before receiving the data from the system controller.

8. The mobile communication system according to claim 7, wherein, when receiving the replay signal from the mobile terminal, the system controller transmits the data addressed to the mobile terminal.

9. The mobile communication system according to claim 7, wherein, when no replay signal is received from the mobile terminal after the start-up signal has been transmitted a predetermined number of times, the system controller transmits the data addressed to the mobile terminal through the one-way communication system.

10. The mobile communication system according to claim 1, wherein each of the mobile terminals comprises:
a determiner for determining whether the mobile terminal exists within or outside the wide one-way communication area based on a received signal from the wide one-way communication area.

11. The mobile communication system according to claim 10, wherein, when the determiner determines that the mobile terminal exists outside the wide one-way communication area, the mobile terminal activates a two-way communication transceiver provided therein so as to receive the data addressed thereto.

12. The mobile communication system according to claim 1, wherein each of the mobile terminals comprises a detector for detecting a wide area radio condition of the wide one-way communication area and a cellular radio condition of the cellular two-way communication area, respectively, wherein the mobile terminal transmits terminal information including the wide area radio condition and the cellular radio condition to the system controller,
wherein the system controller selects one of the one-way communication system and the two-way communication system depending to which one of the wide area radio condition and the cellular radio condition is better.

13. The mobile communication system according to claim 12, wherein the system controller transmits a start-up signal to the mobile terminal through the one-way communication system, the start-up signal causing the mobile terminal to activate a two-way communication transceiver provided therein so as to receive the data addressed thereto.

14. The mobile communication system according to claim 13, wherein, when receiving the start-up signal from the system controller, the mobile terminal transmits a data check signal to the system controller through the two-way communication system at predetermined time intervals, the data check signal causing the system controller to search for the data addressed to the mobile terminal, and the mobile terminal receives the data from the system controller when the data is found.

15. A data transmission method in a mobile communication system comprising:
a one-way communication system where a wide area base station forms a wide one-way communication area;
a two-way communication system having a cellular service area which is formed by a plurality of cell base stations each forming a cellular two-way communication area;
a plurality of mobile terminals each for communicating with the one-way communication system and the two-way communication system; and a system controller connected to the one-way communication system and the two-way communication system, for controlling mobile communications in the wide one-way communication are and/or the cellular service area,
the data transmission method comprising the steps of:
selecting one of the one-way communication system and the two-way communication system; and
transferring to the mobile telephone data addressed thereto through a selected one of the one-way communication system and the two-way communication system.

16. The data transmission method according to claim 15, further comprising the steps of:
at the system controller,
transmitting a start-up signal to the mobile terminal through the one-way communication system, the start-up signal causing the mobile terminal to activate a two-way communication transceiver provided therein so as to receive the data addressed thereto.

17. The data transmission method according to claim 16, further comprising the steps of:
at the mobile terminal,
receiving the start-up signal from the system controller;
transmitting a data check signal to the system controller through the two-way communication system at predetermined time intervals, the data check signal causing the system controller to search for the data addressed to the mobile terminal; and
receiving the data from the system controller when the data is found.

18. The data transmission method according to claim 16, further comprising the steps of:
at the mobile terminal,
receiving the start-up signal from the system controller;
transmits a reply signal to the start-up signal to the system controller; and
receiving the data from the system controller.

19. The data transmission method according to claim 18, further comprising the steps of:
at the system controller,
receiving the replay signal from the mobile terminal; and
transmitting the data addressed to the mobile terminal.

20. The data transmission method according to claim 18, further comprising the steps of:
at the system controller,
transmitting the start-up signal a predetermined number of times unless the replay signal is received from the mobile terminal; and
transmitting the data addressed to the mobile terminal through the one-way communication system when the replay signal is not received finally.

21. The data transmission method according to claim 17, further comprising the steps of:
at the mobile terminal,
receiving the start-up signal from the system controller;
transmits a reply signal to the start-up signal to the system controller; and
receiving the data from the system controller.

22. The data transmission method according to claim 21, further comprising the steps of:
at the system controller,
receiving the replay signal from the mobile terminal; and
transmitting the data addressed to the mobile terminal.

23. The data transmission method according to claim 21, further comprising the steps of:

at the system controller, transmitting the start-up signal a predetermined number of times unless the replay signal is received from the mobile terminal; and transmitting the data addressed to the mobile terminal through the one-way communication system when the replay signal is not received finally.

24. The data transmission method according to claim 15, further comprising the steps of at each of the mobile terminals, detecting a wide area radio condition of the wide one-way communication area and a cellular radio condition of the cellular two-way communication area, respectively; and transmitting terminal information including the wide area radio condition and the cellular radio condition to the system controller; and at the system controller, selecting one of the one-way communication system and the two-way communication system depending to which one of the wide area radio condition and the cellular radio condition is better.

25. The data transmission method according to claim 24, further comprising the steps of:

at the system controller, transmitting a start-up signal to the mobile terminal through the one-way communication system, the start-up signal causing the mobile terminal to activate a two-way communication transceiver provided therein so as to receive the data addressed thereto.

26. The data transmission method according to claim 25, further comprising the steps of:

at the mobile terminal, receiving the start-up signal from the system controller;

transmitting a data check signal to the system controller through the two-way communication system at predetermined time intervals, the data check signal causing the system controller to search for the data addressed to the mobile terminal; and receiving the data from the system controller when the data is found.

27. A mobile terminal in a mobile communication system including a wide one-way communication system and a cellular two-way communication system, comprising:

a wide area receiver operating at relatively low power, for receiving a selective calling signal from a wide area base station of the wide one-way communication system;

a cell transceiver operating at higher power than the wide area receiver, for two-way communication with a nearest cell base station of the cellular two-way communication system; and a communication controller for causing the wide area receiver to operate at all times and causing the cell transceiver to start operating for data reception when a start-up signal is received from the wide base station.

28. The mobile terminal according to claim 27, further comprising:

a determiner for determining whether the mobile terminal exists within or outside the wide one-way communication area based on a received signal of the wide area receiver, wherein the communication controller causes the cell transceiver to start operating for data reception when the determiner determines that the mobile terminal exists outside the wide one-way communication area.

29. A mobile terminal in a mobile communication system including a wide one-way communication system and a cellular two-way communication system, comprising:

a wide area receiver operating at relatively low power, for receiving a selective calling signal from a wide area base station of the wide one-way communication system;

a cell transceiver operating at higher power than the wide area receiver, for two-way communication with a nearest cell base station of the cellular two-way communication system; and a communication controller for causing the wide area receiver to intermittently operate at all times and causing the cell transceiver to start operating for data reception when a start-up signal is received from the wide base station and further to transmit a data check signal to the mobile communication system, the data check signal causing the mobile communication system to search for data addressed to the mobile terminal.

30. The mobile terminal according to claim 29, further comprising:

a determiner for determining whether the mobile terminal exists within or outside the wide one-way communication area based on a received signal of the wide area receiver, wherein the communication controller causes the cell transceiver to start operating for data reception when the determiner determines that the mobile terminal exists outside the wide one-way communication area.

31. A mobile terminal in a mobile communication system including a wide one-way communication system and a cellular two-way communication system, comprising:

a wide area receiver operating at relatively low power, for receiving a selective calling signal from a wide area base station of the wide one-way communication system;

a cell transceiver operating at higher power than the wide area receiver, for two-way communication with a nearest cell base station of the cellular two-way communication system;

a detector for detecting a wide area radio condition of the wide one-way communication area and a cellular radio condition of the cellular two-way communication area, respectively; and a communication controller for transmitting terminal information including the wide area radio condition and the cellular radio condition to the system controller.

* * * * *